US00RE43468E

(19) United States
(12) Reissued Patent
Oda et al.

(10) Patent Number: US RE43,468 E
(45) Date of Reissued Patent: Jun. 12, 2012

(54) ALUMINA PARTICLES OF HIGH ASPECT RATIO, ALUMINA PARTICLE MANUFACTURING METHOD, RESIN COMPOSITION, AND RESIN COMPOSITION MANUFACTURING METHOD

(75) Inventors: Takashi Oda, Yokosuka (JP); Yasuaki Kai, Yokohama (JP); Tomohiro Ito, Yokohama (JP)

(73) Assignee: Nissan Motor Co., Ltd., Yokohama-shi (JP)

(21) Appl. No.: 12/621,060

(22) Filed: Nov. 18, 2009

Related U.S. Patent Documents

Reissue of:

(64) Patent No.: 7,476,440
Issued: Jan. 13, 2009
Appl. No.: 11/200,049
Filed: Aug. 10, 2005

(30) Foreign Application Priority Data

Aug. 26, 2004 (JP) ..... 2004-246828

(51) Int. Cl.
*B32B 5/16* (2006.01)
*C04B 14/30* (2006.01)

(52) U.S. Cl. ..... 428/329; 106/409; 252/582; 423/625; 423/629; 428/402

(58) Field of Classification Search ..... 428/329, 428/402; 106/409; 252/582; 423/625, 629
See application file for complete search history.

(56) References Cited

U.S. PATENT DOCUMENTS

| | | | | |
|---|---|---|---|---|
| 2,915,475 | A * | 12/1959 | Bugosh | 516/94 |
| 4,076,638 | A | 2/1978 | Redmore et al. | |
| 4,115,485 | A | 9/1978 | Genessi | |
| 4,126,650 | A | 11/1978 | Via et al. | |
| 4,183,843 | A | 1/1980 | Koenig et al. | |
| 4,233,184 | A | 11/1980 | Cull | |
| 4,258,142 | A | 3/1981 | Ohzeki et al. | |
| 4,420,341 | A | 12/1983 | Ferrigno | |
| 4,492,682 | A * | 1/1985 | Trebillon | 423/626 |
| 4,629,618 | A * | 12/1986 | Oguri et al. | 423/625 |
| 4,629,717 | A | 12/1986 | Chao | |
| 4,650,783 | A | 3/1987 | Chao et al. | |

(Continued)

FOREIGN PATENT DOCUMENTS

EP 0 707 051 A1 4/1996

(Continued)

OTHER PUBLICATIONS

Gary A. Nitowski, "Topographic and Surface Chemical Aspects of the Adhesion of Structural Epoxy Resins to Phosphorus Oxo Acid Treated Aluminum Adherends," Dissertation submitted to the Faculty of the Virginia Polytechnic Institute and State University, 1998, pp. 1-213, cover sheet, abstract and table of contents.

(Continued)

*Primary Examiner* — Hoa (Holly) Le
(74) *Attorney, Agent, or Firm* — Foley & Lardner LLP

(57) ABSTRACT

An alumina particle (1) of the present invention has an alumina body with a short axis length (b) of 1 to 10 nm, a long axis length (a) of 20 to 400 nm and an aspect ratio (a/b) of 5 to 80. The alumina body is expressed by a Formula I, and n is not less than 0.

$Al_2O_3.nH_2O$ Formula I

24 Claims, 6 Drawing Sheets

U.S. PATENT DOCUMENTS

| | | | | | |
|---|---|---|---|---|---|
| 4,716,029 | A | * | 12/1987 | Oguri et al. | 423/625 |
| 4,960,749 | A | | 10/1990 | Miura et al. | |
| 4,994,429 | A | | 2/1991 | Wieserman et al. | |
| 5,001,204 | A | | 3/1991 | Klendworth et al. | |
| 5,306,680 | A | | 4/1994 | Fukuda | |
| 5,397,391 | A | | 3/1995 | Stramel | |
| 5,576,389 | A | | 11/1996 | Ueno et al. | |
| 5,759,213 | A | * | 6/1998 | Adair et al. | 23/305 A |
| 5,837,049 | A | | 11/1998 | Watson et al. | |
| 6,015,456 | A | | 1/2000 | Fukuda et al. | |
| 6,159,441 | A | * | 12/2000 | Mohri et al. | 423/625 |
| 6,197,277 | B1 | | 3/2001 | Fukuda et al. | |
| 6,218,454 | B1 | | 4/2001 | Nosu et al. | |
| 6,440,552 | B1 | | 8/2002 | Kajihara et al. | |
| 6,838,005 | B2 | | 1/2005 | Tepper et al. | |
| 6,846,435 | B1 | | 1/2005 | Bohnen et al. | |
| 6,887,517 | B1 | | 5/2005 | Cook et al. | |
| 7,189,775 | B2 | * | 3/2007 | Tang et al. | 524/437 |
| 7,476,440 | B2 | | 1/2009 | Oda et al. | |
| 7,531,161 | B2 | * | 5/2009 | Tang et al. | 423/625 |
| 2002/0147261 | A1 | | 10/2002 | Warth et al. | |
| 2003/0043586 | A1 | | 3/2003 | Sagal et al. | |
| 2003/0060572 | A1 | | 3/2003 | Causa et al. | |
| 2003/0197300 | A1 | | 10/2003 | Tang et al. | |
| 2004/0173121 | A1 | | 9/2004 | Fukuo et al. | |
| 2006/0058426 | A1 | | 3/2006 | Oda et al. | |
| 2006/0234102 | A1 | | 10/2006 | Nakato et al. | |
| 2006/0289411 | A1 | | 12/2006 | Chang et al. | |
| 2006/0289841 | A1 | | 12/2006 | Ito et al. | |
| 2008/0031808 | A1 | | 2/2008 | Bauer et al. | |
| 2009/0326097 | A1 | | 12/2009 | Fujita et al. | |
| 2010/0210777 | A1 | | 8/2010 | Oda et al. | |
| 2010/0256270 | A1 | | 10/2010 | Souma et al. | |

FOREIGN PATENT DOCUMENTS

| | | | |
|---|---|---|---|
| EP | 1 428 860 | A1 | 6/2004 |
| JP | 57-168954 | A | 10/1982 |
| JP | 05-098083 | A | 4/1993 |
| JP | 7-102112 | A | 4/1995 |
| JP | 07-102112 | A | 4/1995 |
| JP | 7-047644 | B2 | 5/1995 |
| JP | 7-47644 | B2 | 5/1995 |
| JP | 08-073723 | A | 3/1996 |
| JP | 8-73723 | A | 3/1996 |
| JP | 2519045 | B2 | 5/1996 |
| JP | 8-333115 | A | 12/1996 |
| JP | 10-030039 | A | 2/1998 |
| JP | 10-070022 | A | 3/1998 |
| JP | 11-310643 | A | 11/1999 |
| JP | 11-343349 | A | 12/1999 |
| JP | 2000-053871 | A | 2/2000 |
| JP | 2000-239014 | A | 9/2000 |
| JP | 2001-261976 | A | 9/2001 |
| JP | 2003-054941 | A | 2/2003 |
| JP | 2003-54941 | A | 2/2003 |
| JP | 2004-51390 | A | 2/2004 |
| JP | 2004-149687 | A | 5/2004 |
| JP | 2006-56739 | A | 3/2006 |
| JP | 2006-62905 | A | 3/2006 |
| WO | WO-98/57612 | A1 | 12/1998 |
| WO | WO-01/03824 | A1 | 1/2001 |
| WO | WO 2004-037721 | A | 5/2004 |
| WO | WO 2008/016048 | A1 | 2/2008 |
| WO | WO 2009/011278 | A1 | 1/2009 |

OTHER PUBLICATIONS

Hideyuki et al., "Study on the surface characteristics of inorganic oxide powder of a monbutyl phosphoric ester by using a photentionmeter tiration," Journal of Adhesion Society of Japan, vol. 39, No. 7, 2003, pp. 248-254.

M. Higo et al., "Characterization of Metal Oxide Surfaces and Thin Semiconductor Films by Inelastic Electron Tunneling Spectroscopy," Analytical Sciences, vol. 18, Mar. 2002, pp. 227-242.

M.K. Templeton et al., "Decomposition of Phosphonate Esters Adsorbed on Aluminum Oxide," J. Am. Chem. Soc., vol. 107, 1985, pp. 774-779.

R. Coast et al., "A vibrational spectroscopic comparison of vinyltriethoxysilane and vinylphosphonic acid adsorbed on oxidized aluminum," J. Adhesion Sci. Technol., vol. 10, No. 2, (1996), pp. 101-121.

T. Sugimoto, "Monodispersed Particles," Elsevier Science B.V., (2001), pp. 193, 225, 270-289.

F. Billmeyer, Jr., "Textbook of polymer Science, 3rd Edition", John Wiley & Sons, Inc., New York, (1984), pp. 417-418. -.

R.D. Ramsier et al., "Adsorption of Phosphorus Acids on Alumina,". Surface Science, vol. 203 (1988), pp. 72-88.

T. Ito, U.S. PTO Office Action, U.S. Appl. No. 11/471,731 dated Mar. 19, 2008, 5 pgs.

T. Ito, U.S. PTO Office Action, U.S. Appl. No. 11/471,731 dated Jun. 9, 2008, 15 pgs.

T. Ito, U.S. PTO Office Action, U.S. Appl. No. 11/471,731 dated Nov. 14, 2008, 14 pgs.

T. Oda, U.S. PTO Office Action, U.S. Appl. No. 11/220,402 dated Jul. 31, 2008, 17 pgs.

T. Oda U.S. PTO Final Office Action, U.S. Appl. No. 11/220,402 dated Jan. 13, 2009, 18 pgs.

T. Oda U.S. PTO Office Action, U.S. Appl. No. 11/220,402 dated Sep. 1, 2009, 29 pgs.

T. Oda U.S. PTO Final Office Action, U.S. Appl. No. 11/220,402 dated Mar. 9, 2010, 11 pgs.

T. Oda U.S. PTO Office Action, U.S. Appl. No. 12/768,378 dated Feb. 2, 2011, 27 pgs.

T. Oda U.S. PTO Examiner's Answer, U.S. Appl. No. 11/220,402 dated Jan. 4, 2011, 30 pgs.

Sasol Brochure, "Disperal/Dispal", Feb. 2007.*

Tadao Sugimoto, "Monodispersed Particles". Elsevier, Amsterdam, 2001.

* cited by examiner

FIG. 6

| | ALUMINUM RAW MATERIAL | | | SODIUM HYDROXIDE | | pH AFTER STIRRING | HEAT TREATMENT | | | |
|---|---|---|---|---|---|---|---|---|---|---|
| | TYPE | CONCENTRATION | LIQUID AMOUNT | CONCENTRATION | LIQUID AMOUNT | | FIRST HEAT TREATMENT | SECOND HEAT TREATMENT | THIRD HEAT TREATMENT | FOURTH HEAT TREATMENT |
| Ex. 1 | $AlCl_3 \cdot 6H_2O$ | 2.00 M | 20 ml | 4.80 M | 20 ml | 4.54 | 120℃, 24h | 180℃, 20 min | 10℃, 1h | 140℃, 1week |
| Ex. 2 | $AlCl_3 \cdot 6H_2O$ | 2.00 M | 20 ml | 5.10 M | 20 ml | 7.18 | 120℃, 24h | 180℃, 20 min | 10℃, 1h | 140℃, 1week |
| Ex. 3 | $Al(NO)_3 \cdot 9H_2O$ | 1.50 M | 20 ml | 4.50 M | 20 ml | 3.59 | 120℃, 24h | 180℃, 16 min | 10℃, 1h | 140℃, 4days |
| Ex. 4 | $Al(NO)_3 \cdot 9H_2O$ | 1.50 M | 20 ml | 5.10 M | 20 ml | 5.11 | 120℃, 24h | 180℃, 16 min | 10℃, 1h | 140℃, 4days |
| Ex. 5 | $Al(NO)_3 \cdot 9H_2O$ | 2.00 M | 20 ml | 5.40 M | 20 ml | 7.20 | 120℃, 24h | 180℃, 16 min | 10℃, 1h | 140℃, 4days |
| Ex. 6 | Sodium alum | 2.00 M | 20 ml | 4.00 M | 20 ml | 4.13 | 120℃, 24h | 180℃, 20 min | 10℃, 1h | 140℃, 4days |
| Ex. 7 | $AlCl_3 \cdot 6H_2O$ | 2.00 M | 20 ml | 5.40 M | 20 ml | 9.92 | 120℃, 24h | 180℃, 20 min | 10℃, 1h | 140℃, 1week |
| Ex. 8 | $AlCl_3 \cdot 6H_2O$ | 2.00 M | 20 ml | 5.10 M | 20 ml | 7.05 | 180℃, 8h | - | - | - |
| Ex. 9 | $AlCl_3 \cdot 6H_2O$ | 2.00 M | 20 ml | 5.34 M | 20 ml | 9.58 | 180℃, 8h | - | - | - |

FIG. 7

| | SHAPE | TYPE | AVERAGE SHORT DIAMETER (nm) | STANDARD DEVIATION (nm) | AVERAGE LONG DIAMETER (nm) | STANDARD DEVIATION (nm) | ASPECT RATIO |
|---|---|---|---|---|---|---|---|
| Ex.1 | NEEDLE SHAPE | BOEHMITE | 5.5 | 0.5 | 350 | 37 | 45-80 |
| Ex.2 | NEEDLE SHAPE | BOEHMITE | 4.6 | 0.6 | 115 | 10 | 20-30 |
| Ex.3 | NEEDLE SHAPE | BOEHMITE | 5.4 | 0.5 | 278 | 25 | 45-60 |
| Ex.4 | NEEDLE SHAPE | BOEHMITE | 4.7 | 0.4 | 165 | 15 | 30-40 |
| Ex.5 | NEEDLE SHAPE | BOEHMITE | 5.2 | 0.6 | 80 | 8 | 10-18 |
| Ex.6 | NEEDLE SHAPE | BOEHMITE | 5.5 | 0.5 | 360 | 34 | 50-80 |
| Ex.7 | PLATE SHAPE | BOEHMITE | 7.4 (THICKNESS) | 0.6 | 35 (ONE SIDE) | 4 | 4-6 |
| Ex.8 | NEEDLE SHAPE | BOEHMITE | 5.3 | 1 | 129 | 21 | 15-30 |
| Ex.9 | AMORPHOUS | BOEHMITE | - | - | - | - | - |
| Ex.10 | NEEDLE SHAPE | α ALUMINA | 5.4 | 0.6 | 353 | 33 | 45-80 |
| Ex.11 | NEEDLE SHAPE | α ALUMINA | 4.7 | 0.5 | 110 | 10 | 20-30 |

FIG. 8

| | RESIN | FILLING PARTICLE | CONTENT OF PARTICLES (%) | PARTICLE ASPECT RATIO | TONE | LIGHT TRANSMITTANCE (%) | BENDING STRENGTH (GPa) | FLEXURAL MODULUS (MPa) | COEFFICIENT OF LINEAR EXPANSION ($10^{-5}$/°C) |
|---|---|---|---|---|---|---|---|---|---|
| Ex. 12 | PC | Ex. 1 | 10.7 | 45-80 | COLORLESS/ NEARLY TRANSPARENT | 75% | 130 | 5.0 | 5.5 |
| Ex. 13 | PC | Ex. 2 | 10.3 | 20-30 | COLORLESS/ TRANSPARENT | 85% | 116 | 4.0 | 5.8 |
| Ex. 14 | PC | Ex. 4 | 9.8 | 30-40 | COLORLESS/ TRANSPARENT | 82% | 120 | 4.1 | 5.7 |
| Ex. 15 | PC | Ex. 10 | 10.6 | 45-80 | COLORLESS/ NEARLY TRANSPARENT | 73% | 130 | 4.6 | 6.3 |
| Ex. 16 | PC | Ex. 11 | 9.9 | 20-30 | COLORLESS/ TRANSPARENT | 86% | 109 | 3.7 | 6.7 |
| Ex. 17 | ACRYLATE RESIN | Ex. 1 | 10.6 | 45-80 | COLORLESS/ NEARLY TRANSPARENT | 78% | 132 | 5.1 | 6.0 |
| Ex. 18 | ACRYLATE RESIN | Ex. 2 | 10.6 | 20-30 | COLORLESS/ TRANSPARENT | 88% | 126 | 4.3 | 6.2 |
| Ex. 19 | ACRYLATE RESIN | Ex. 4 | 10.8 | 30-40 | COLORLESS/ TRANSPARENT | 85% | 129 | 4.4 | 6.2 |
| Ex. 20 | ACRYLATE RESIN | Ex. 10 | 10.4 | 45-80 | COLORLESS/ NEARLY TRANSPARENT | 74% | 127 | 4.1 | 6.1 |
| Ex. 21 | ACRYLATE RESIN | Ex. 11 | 10.7 | 20-30 | COLORLESS/ TRANSPARENT | 88% | 124 | 3.9 | 6.2 |

FIG. 9

| | RESIN | FILLING PARTICLE | CONTENT OF PARTICLES (%) | PARTICLE ASPECT RATIO | TONE | LIGHT TRANSMITTANCE (%) | BENDING STRENGTH (GPa) | FLEXURAL MODULUS (MPa) | COEFFICIENT OF LINEAR EXPANSION ($10^{-5}$/℃) |
|---|---|---|---|---|---|---|---|---|---|
| COM. EX.2 | PC | COM. EX.1 | 9.2 | 20-30 | WHITE/ OPAQUE | 10% | 110 | 3.8 | 6.9 |
| COM. EX.3 | PC | ALUMINA SOL 520 | 9.4 | 5-8 | WHITE/ OPAQUE | 20% | 104 | 3.3 | 7.3 |
| COM. EX.4 | PC | ALUMINUM OXIDE C | 10.4 | 1 | WHITE/ ALMOST OPAQUE | 42% | 98 | 3.1 | 7.5 |
| COM. EX.5 | PC | CAM9010 | 10.2 | 3-7 | PALE YELLOW/ OPAQUE | 30% | 100 | 3.4 | 7.2 |
| COM. EX.6 | PC | MEK-ST | 10.6 | 1 | WHITE/ OPAQUE | 15% | 90 | 2.5 | 7.3 |

ALUMINA PARTICLES OF HIGH ASPECT RATIO, ALUMINA PARTICLE MANUFACTURING METHOD, RESIN COMPOSITION, AND RESIN COMPOSITION MANUFACTURING METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an alumina particle, a method of manufacturing the alumina particle, a resin composition, and a method of manufacturing the resin composition.

2. Description of the Related Art

To improve properties of materials such as rigidity and strength, active studies and developments have been conducted for organic-inorganic nanocomposite materials in which an inorganic particle material is blended in resin, and various manufacturing methods thereof have been proposed. A typical one thereof is a composite material described in the Japanese Patent Examined Publication No. H7-47644. This publication shows a method to obtain a composite of nylon and the filler, in which montmorillonite is used as an inorganic filler of the resin and caprolactam as a raw material of nylon is impregnated between montmorillonite layers to be polymerized. With this method, mechanical properties of the composite, for example, strength, elastic modulus, surface hardness, and heat resistance were improved, but applications thereof were limited due to the insufficient transparency, hydroscopic property, and surface hardness thereof.

The Japanese Patent Unexamined Publication No. H8-73723 discloses a resin composition including polycarbonate (PC) with a rare-earth element blended. This resin composition was more effective than polycarbonate alone in terms of the transparency, but did not increase in strength, elastic modulus, surface hardness, and heat resistance.

On the other hand, the Japanese Patent Unexamined Publication No. H11-343349 discloses a resin window which achieves an increase in rigidity, strength, and the like as well as an increase in transparency. This resin window is composed of a transparent resin composition which includes a transparent amorphous organic polymer and fine silica particles blended therein, the silica particles having a diameter of not more than wavelength of visible light. The resin composition maintains transparency and increases in strength, elastic modulus, impact resistance, and the like to some extent. However, the silica particles do not adequately reinforce the resin composition because the aspect ratio thereof is 1.

The Japanese Patent Unexamined Publication No. H7-102112 discloses a resin composition using carbon nanotubes as an additive having a diameter of not more than the wavelength of visible light and a high aspect ratio to increase the reinforcing effect. However, the resin is colored black with a few percent of the additive, causing a problem of disfigurement.

Furthermore, alumina and boehmite particles are used as the filler. The Japanese Patent Unexamined Publication No. 2003-54941 discloses a resin composition obtained by melting and kneading needle-shaped boehmite and alumina particles with a long axis length of 1 to 10 μm and an aspect ratio of 40 to 70. However, the fillers have particle sizes considerably exceeding the wavelength of visible light, and the filler particles are not adequately dispersed in the resin, so that the resin composition is not transparent.

SUMMARY OF THE INVENTION

Using glass fibers or carbon fibers as the filler to improve the mechanical properties like the conventional compositions increases the mechanical strength but reduces the transparency because of size of the fibers themselves. Furthermore, the surface state such as smoothness and pattern are deteriorated, and the resin viscosity increases to reduce the moldability. If particles with a low aspect ratio are used as the filler to avoid these problems, the problems are suppressed to some extent. However, the mechanical strength is not increased so much, and the filler does not reinforce the resin. The mechanical properties, the optical properties including the transparency and appearance, and the moldability have a trade-off relationship. Accordingly, a resin composition containing a filler improving in these properties has been desired.

The present invention was made for solving the aforementioned problems, and the object thereof is to provide a resin composition excellent in mechanical strength while maintaining the transparency.

The first aspect of the present invention provides an alumina particle comprising: an alumina body with a short axis length of 1 to 10 nm, a long axis length of 20 to 400 nm and an aspect ratio of 5 to 80, the alumina body being expressed by a Formula I, $$Al_2O_3.nH_2O \qquad \text{Formula I}$$

wherein n is not less than 0.

The second aspect of the present invention provides a method of manufacturing an alumina particle comprising: adding an alkali aqueous solution in an aqueous solution with an aluminum salt dissolved to produce a reaction mixture containing a gel material of aluminum hydroxide; first heating the reaction mixture at a first temperature not lower than room temperature; after the first heating, second heating the reaction mixture at a second temperature higher than the first temperature; after the second heating, third heating the reaction mixture at a third temperature lower than the second temperature; and after the third heating, fourth heating the reaction mixture at a fourth temperature not less than the room temperature.

The third aspect of the present invention provides a resin composition comprising: resin; and an alumina particle contained in the resin as a filler, the alumina particle comprising: an alumina body with a short axis length of 1 to 10 nm, a long axis length of 20 to 400 nm and an aspect ratio of 5 to 80, the alumina body being expressed by a Formula I, $$Al_2O_3.nH_2O \qquad \text{Formula I}$$

wherein n is not less than 0.

The fourth aspect of the present invention provides a method of manufacturing a resin composition comprising: mixing a monomer as a raw material of resin and an alumina particle contained in the resin as a filler; polymerizing the monomer in a state where the monomer and the alumina particle are mixed, wherein a method of manufacturing the alumina particle comprises: adding an alkali aqueous solution in an aqueous solution with an aluminum salt dissolved to produce a reaction mixture containing a gel material of aluminum hydroxide; first heating the reaction mixture at a first temperature not lower than room temperature; after the first heating, second heating the reaction mixture at a second temperature higher than the first temperature; after the second heating, third heating the reaction mixture at a third temperature lower than the second temperature; and after the third heating, fourth heating the reaction mixture at a fourth temperature not less than the room temperature.

BRIEF DESCRIPTION OF THE DRAWINGS

The invention will now be described with reference to the accompanying drawings wherein;

FIG. 6 is a table showing experimental conditions of Examples 1 to 9;

FIG. 7 is a table showing evaluation results of alumina of Examples 1 to 11;

FIG. 8 is a table showing experimental conditions and evaluation results of resin compositions of Examples 12 to 21; and FIG. 9 is a table showing experimental conditions and evaluation results of resin compositions of Comparative Examples 2 to 6.

DETAILED DESCRIPTION OF THE PREFERRED EMBODIMENT

Hereinafter, description will be made of embodiments of the present invention with reference to the drawings.

Alumina Particle

Alumina particles 1 of the present invention are expressed by the following general Formula I.

$$Al_2O_3.nH_2O \qquad \text{Formula I}$$

The above formula expresses aluminum oxide when n is 0, and the aluminum oxide is at least one of α alumina, γ alumina, δ alumina, and θ alumina. The formula expresses boehmite when n is 1. When n is more than 1 and less than 3, the formula expresses a mixture of boehmite and alumina hydrate of an amorphous structure, which is generally called pseudo boehmite. Furthermore, when n is 3 or more, the formula expresses alumina hydrate of an amorphous structure. The alumina particles as a filler are at least any one selected from these. Alumina particles preferable for the filler of a resin composition are, particularly, α alumina and boehmite in terms of the stability and easy manufacturing.

Figure 1:
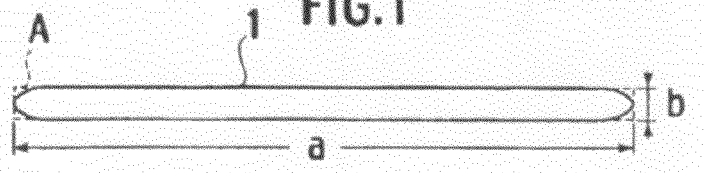
FIG. 1 is a schematic view showing an example of an alumina particle of the present invention.
Figure 2:
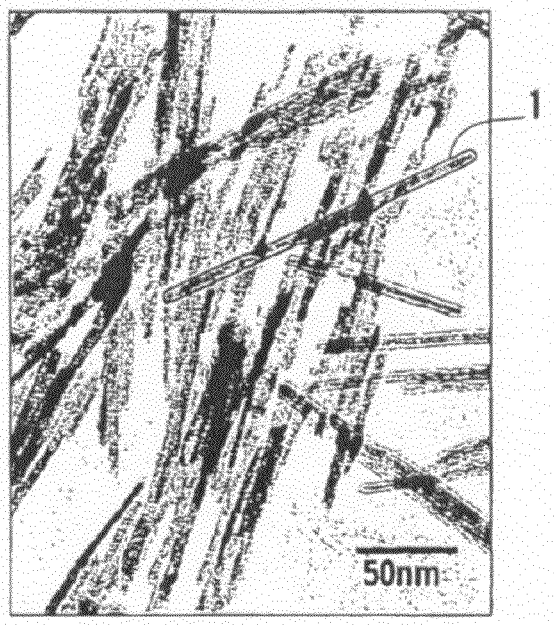
FIG. 2 is an electron micrograph of boehmite particles manufactured in Example 1.

The alumina particle of the present invention may be either fiber-shaped, spindle-shaped, stick-shaped, needle-shaped, tubular, or columnar. The short axis length of the primary particle is within a range from 1 to 10 nm, the long axis length thereof is within a range from 20 to 400 nm, and the aspect ratio thereof is within a range from 5 to 80. For obtaining a highly transparent resin composition by blending the alumina particles, as shown in FIGS. 1 and 2, it is preferable that the particles have a needle shaped crystals. Specifically, it is more preferable that the particle has a short axis length of not more than 6 nm and a long axis length of 50 to 100 nm. Herein, as shown in FIG. 1, assuming a rectangle A with a smallest area among rectangles circumscribed to a target particle in a microscope image or the like, the long axis indicates a long side a of the rectangle A, and the short axis indicates a short side b of the above smallest rectangle A. The aspect ratio indicates a value of the long axis length/the short axis length (a/b).

Figure 3:
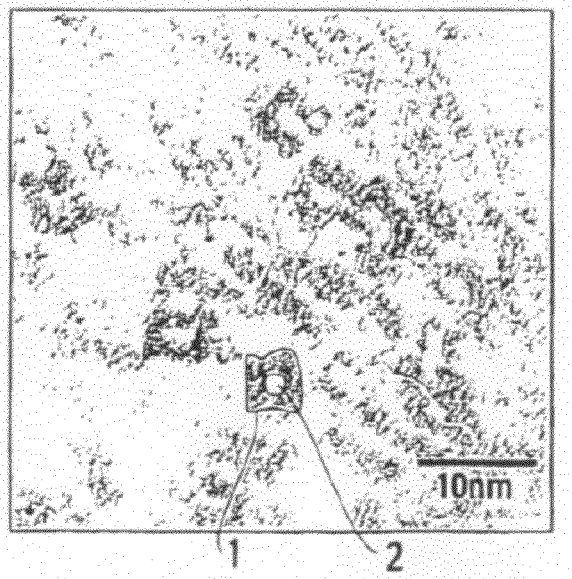
FIG. 3 is an electron micrograph of cross sections of the boehmite particles manufactured in Example 1.

As shown in FIG. 3, preferably, each alumina particle 1 includes a cylindrical hollow 2 inside. As for the size of the hollow 2, preferably, the diameter thereof is within a range from 0.5 to 9.5 nm, which is not more than the short axis length of the particles 1, and the length thereof is within a range from 5 to 400 nm, which is not more than the long axis length of the particles. This can reduce the specific gravity of the alumina particles 1. Accordingly, when the alumina particles 1 are contained in the resin as the filler, the weight of the obtained resin composition is maintained at a comparatively lightweight while the mechanical strength of the obtained resin composition can be increased and the high transparency thereof can be achieved. In the alumina particles 1 of the present invention, the hollow 2 inside is not an essential element. In other words, the alumina particles 1 can achieve the object of the present invention without the hollow 2.

Alumina Particle Manufacturing Method

Next, a description is given of a method of manufacturing the alumina particles of the present invention. First, the description is given of a method of manufacturing the boehmite particles with n=1 in the aforementioned general formula.

<Production of Reaction Mixture>

In manufacturing the boehmite, first, an alkaline aqueous solution is added to an aluminum salt aqueous solution to prepare a gel material of aluminum hydroxide.

The aluminum salt constituting the aluminum salt aqueous solution is at least an aluminum salt selected from aluminum chloride anhydride, aluminum chloride hexahydrate, aluminum bromide, aluminum bromide hexahydrate, aluminum iodide, aluminum nitrate nonahydrate, aluminum lactate, aluminum sodium sulfate dodecahydrate (sodium alum), aluminum perchlorate nonahydrate, aluminum isopropoxide, aluminum s-butoxide, aluminum t-butoxide, and the like. Among these, aluminum chloride hexahydrate, aluminum nitrate nonahydrate, aluminum bromide hexahydrate, aluminum sodium sulfate dodecahydrate, and aluminum isopropoxide are preferred, which are easily available on the market, easy to use, and cheap.

The alkaline aqueous solution is added to an action system to promote hydrolysis of the aluminum salt. An alkaline compound constituting the alkaline aqueous solution can be at least one selected from sodium hydroxide, potassium hydroxide, calcium hydroxide, barium hydroxide, and the like. Sodium hydroxide is particularly preferred.

Water insoluble salt as a by-product in the reaction mixture is properly removed.

Preferably, an amount of the alkaline compound is two to four times the amount of aluminum salt in molar ratio. In other words, a ratio of a concentration of the aqueous solution with the aluminum salt and a concentration of the alkali aqueous solution is 1/4 to 1/2 in molar ratio. The alkaline compound less than two times is insufficient to produce a reaction product by performing a heat treatment. Moreover, in some cases, gelation of the reaction solution is not caused, and the particles cannot be obtained with a good yield. On the contrary, when the amount of the alkaline compound is more than four times that of the aluminum salt, the pH of the reaction mixture is too high, and the alkali dissolves the gel, thus increasing adhering and aggregating particles in some cases.

Preferably, the concentration of the aluminum salt aqueous solution is within a range from 0.1 to 0.3 M, and the concentration of the alkaline aqueous solution is within a range from 4.0 to 10.0 M. This can facilitate formation of the gel material in the reaction mixture of the aluminum salt aqueous solution and the alkaline aqueous solution. The concentration of the metallic salt in the aluminum salt aqueous solution is, as described above, preferably, 1.0 to 3.0 M and is more preferably 3.0 M in terms of the productivity.

Furthermore, in the present invention, the form of the desired boehmite particles can be controlled by changing the pH of the reaction mixture. For example, the closer the pH is to 4, the longer the long axis of the aluminum particles 1 is, and the higher the aspect ratio thereof is. On the contrary, the closer the pH is to 9, the shorter the long axis of the aluminum particles 1 is, and the lower the aspect ratio thereof is. When the pH is less than 4 or more than 9, plate-shaped particles or amorphous particles increase in some cases.

The pH value of the reaction mixture can be controlled by changing the concentration and the volume of the alkaline aqueous solution.

On the other hand, it is preferable that the volume of the aluminum salt aqueous solution is equal to or larger than the alkaline aqueous solution. When the concentration of the alkaline aqueous solution is low and the volume thereof is too much, the gelation is less likely to occur. If the concentration of the aluminum salt aqueous solution and the volumes of the aluminum salt aqueous solution and alkali aqueous solution are fixed, the form of the particles can be controlled by only changing the concentration of the alkali aqueous solution. Accordingly, setting the volumes same is more preferable for reducing the number of items of the synthesis condition.

Through the above described process, the gel material can be formed in the reaction mixture. In the growth process of the boehmite particles by heat treatments as shown below, therefore, the boehmite particles in the growth process are fixed in the gel material, and adherence and aggregation of the particles are suppressed. It is therefore possible to obtain nano-sized boehmite particles with the particle size distribution range narrowed. Such a particle growing method using a gel material is generally called the gel-sol method (T. Sugimoto, Monodispersed Particles, ELSEVIER, Amsterdam, 2001.). A conventional hydrothermal method was required to carry out the reaction in a dilute solution to prevent adherence and aggregation of the particles during the growth of the particles, which was disadvantageous in the yield. In the present invention, the gel-sol method which increases the concentration of the solution for gelation is employed to prevent the adherence and aggregation. The method of the present invention can therefore achieve a more excellent yield than the conventional method due to the use of the high concentration solution.

<Heat Treatment>

In the present invention, after the aforementioned reaction mixture containing the gel material is produced, first to fourth heat treatments are sequentially carried out. The following heat treatments are carried out while the boehmite particles in the growth process are fixed in the gel material. Accordingly, the particle size distribution range can be extremely narrowed, or the standard deviation can be reduced. As described below, the particle size distribution range can be widened to some extent by properly changing conditions of the heat treatments.

The first heat treatment is carried out by heating the reaction mixture to a first temperature not less than the room temperature. The first heat treatment is mainly to promote hydrolysis of the alkali metal salt generated in the reaction mixture and promote formation of the gel material in the reaction mixture.

The first temperature may be within a range from a room temperature (25° C.) to 140° C., and preferably, 120 to 140° C. considering reaction time. If the first heat treatment is carried out at a temperature above 140° C., boehmite particles with different lengths are generated, and in some cases, the particle size distribution range of the boehmite particles cannot be narrowed even after the subsequent heat treatments are carried out. Preferably, the heat treatment time is 24 hours or more. In the case of less than 24 hours, the standard deviation of the particle size is difficult to reduce.

After the first heat treatment, the second heat treatment is carried out. In this second heat treatment, the reaction mixture is heated to a second temperature higher than the first temperature of the first heat treatment. The second heat treatment is carried out mainly to obtain boehmite particles with a high aspect ratio.

The second temperature needs to be higher than the first temperature and is specifically within a range from 140 to 250° C. In particular, 170 to 250° C. is preferred. When the temperature is lower than 140° C., it takes a long time to generate the particles, and as well as the particle size distribution range is widened. Moreover, temperature higher than 250° C. is advantageous in manufacturing particles with a small aspect ratio. However, temperature higher than 250° C. is not recommended in this manufacturing method because the heat and pressure resistances of an autoclave of a normal grade on the market have upper limits at 250° C. and a great amount of energy is required when the temperature is higher than 250° C.

The heat treatment time in the second heat treatment is preferably within a range from 10 to 30 minutes containing a temperature increasing step, and varies depending on the second temperature. Heating for more than the above time considerably increases the standard deviation of the average particle diameter and turns the needle-shaped particles and the plate-shaped particles into a spindle shape and a particle shape, respectively, reducing the aspect ratio.

After the second heat treatment, the third heat treatment is carried out. This third heat treatment is carried out at a third temperature lower than the second temperature in the second heat treatment. The third heat treatment is performed mainly to narrow the particle size distribution range of the boehmite particles.

The third temperature is set to, for example, 130° C. or lower and preferably, set to the room temperature or lower. It is preferable that the reaction mixture is set to the third temperature by rapid cooling from the second temperature in the second heat treatment. In this case, considering a cost of a cooler and resistance of a vessel to temperature variation, the third heat treatment can be performed by putting the vessel for the heat treatments into running water. Preferably, the time required for the cooling is shorter. Specifically, it is preferable that the time required for cooling is within 10 minutes. The third heat treatment time is preferably 10 minutes or more containing the time required for cooling. This can narrow the particle size distribution range of the desired boehmite particles.

After the third heat treatment, the fourth heat treatment is carried out. This fourth heat treatment is performed mainly to grow the boehmite particles with a high aspect ratio.

A fourth temperature of the fourth heat treatment needs to be set within a temperature range from 100 to 180° C. If the fourth temperature is higher than 180° C., the particle size distribution range increases, and the standard deviation increases. Moreover, needle-shaped and plate-shaped particles are turned into spindle and particle shapes, respectively, thus reducing the aspect ratio in some cases. To be specific, in the fourth heat treatment, if the heat treatment is performed at a temperature of 180° C. or more, the produced particles are remelted and recrystallized (Ostwald ripening), and the shape of the particles and the particle size distribution range cannot be controlled in some cases, which sometimes increases the particle size distribution range. When the fourth temperature is lower than 100° C., the yield is reduced in some cases. The treatment time is four hours to one week, and heating time varies depending on a temperature setting.

After the aforementioned heat treatment, the vessel accommodating the reaction product is allowed to cool, and then the produced boehmite particles and the solution are separated using a centrifugal separator. Thereafter, to remove salt as a by-product, the obtained boehmite particles are centrifuge washed three times with sodium nitrate aqueous solution (0.5 M), centrifuge washed once with water, and centrifuge washed once with water-methanol mixed solution (volume ratio: water/methanol=0.5/9.5), followed by drying to obtain the desired boehmite particles.

Through the above four step heat treatments, it is possible to obtain boehmite particles with a short axis length of 1 to 10 nm, a long axis length of 20 to 400 nm, and an aspect ratio of 50 to 80. Moreover, the standard deviations of the size property values can be suppressed within 10%. Accordingly, when the resin composition is manufactured by causing the boehmite particles to be contained in the predetermined resin, variation in the properties thereof can be reduced. It is therefore possible to produce goods with stable quality from the resin composition.

It is obvious that boehmite particles with different sizes can be manufactured. This can be achieved by carrying out the first heat treatment at a temperature of 140° C. or more for three hours or more and omitting the second to fourth heat treatments. In this case, the standard deviations of the size property values can be 20% or more.

<Baking Treatment>

Next, a description is given of a method of manufacturing α, γ, δ, and θ alumina particles which are expressed by the aforementioned general Formula I when n is 0.

For manufacturing such alumina particles, after the production of the reaction mixture and the heat treatments in the aforementioned method of manufacturing boehmite particles, the obtained boehmite particles are subjected to a baking treatment. The baking treatment is performed, for example, at 450 to 1500° C. for 1 to 3 hours. For example, the boehmite particles obtained by the aforementioned method is put into an alumina crucible and then heated at 1000° C. for 4 hours, thus obtaining a alumina particles. At this time, to prevent the hollow structure characteristic to the aforementioned boehmite particles from being damaged by thermal stress, it is preferable that the temperature increase and decrease rates are 2° C./min. By observation of the a alumina powder with a transmission electron microscope, it is possible to confirm that each particle substantially maintains its form before the baking treatment and is a hollow needle-shaped particle.

Resin Composition

The aforementioned alumina particles 1 can be contained in the resin as the filler, which allows a predetermined resin composition to be obtained.

The amount of the alumina particles 1 blended in the resin is not particularly limited if desired demand characteristics (rigidity, heat resistance, thermal expansion resistance, and the like) can be obtained. The amount of the alumina particles 1 blended is preferably, within a range from 1 to 50% by weight to the resin, and more preferably, 1 to 30% by weight. When the amount of the alumina particles blended is less than 1% by weight, blending the alumina particles has less effect, and the obtained resin composition hardly improves in rigidity, heat resistance, thermal expansion resistance, and the like in some cases. The amount of alumina particles of more than 50% by weight considerably increases the specific gravity and is disadvantageous in terms of cost, leading to problems of increasing the cost and increasing the specific gravity of the resin composition. Moreover, as the content of the alumina particles increases, the viscosity of the resin composition increases, causing bad moldability.

The resin which is caused to contain the alumina particles can be polycarbonate resin, acrylic resin, methacrylic resin, polyester resin, styrene resin, amorphous olefin resin, and the like. In terms of the transparency, heat resistance, and rigidity, thermoplastic resin such as polycarbonate resin, acrylic resin, and methacrylic resin are preferred.

The above resin composition is obtained by the manufacturing method in which the alumina particles and monomer such as the aforementioned thermoplastic resin are putted in a vessel and polymerized in the same.

The polycarbonate resin composition is obtained by adding the alumina particles simultaneously with manufacturing of the polycarbonate resin by a so-called phosgene method, a so-called ester exchange method, or the like. The phosgene method is a condensation reaction of a phenol compound and phosgene, and the ester exchange method is an ester exchange reaction of carbonate diester and hydroxyl compound. The phenol compound is preferably 2,2-bis(4-hydroxyphenyl) propane (common name: bisphenol A), bis(4-hydroxyphenyl)methane, bis(4-hydroxyphenyl)phenylmethane, bis(3,5-dimethyl-4-hydroxyphenyl)ethane, 1-phenyl-1,1-bis(4-hydroxyphenyl)ethane, 2,2-bis(3,5-dimethyl-4-hydroxyphenyl)propane, 1,1-bis(4-hydroxyphenyl)-3,3,5-trimethylcyclohexane, bis(4-hydroxyphenyl)sulfone, 4,4'-dihydroxybenzophenone and more preferably, 2,2-bis(4-hydroxyphenyl)propane, 1,1-bis(4-hydroxyphenyl)-3,3,5-trimethylcyclohexane. These phenols and the like may be used singly or in combination.

The carbonate diester compound can be a diaryl carbonate such as diphenylcarbonate or a dialkyl carbonate such as dimethylcarbonate and diethylcarbonate. The hydroxy compound can be phenol, p-cresol, p-t-butylphenol, p-t-octylphenol, p-cumylphenol, bromophenol, tribromophenol, nonylphenol, or the like.

The methacrylic resin or acrylic resin type resin composition can be obtained by putting the alumina particles, the resin monomer and a polymerization initiator in a same container and polymerizing the resin monomer. The methacrylic and acrylic resin type monomers are methacrylate esters such as methyl(meth)acrylate, ethyl(meth)acrylate, isopropyl(meth) acrylate, n-butyl(meth)acrylate, isobutyl(meth)acrylate, n-amyl(meth)acrylate, isoamyl(meth)acrylate, n-hexyl (meth)acrylate, 2-ethylhexyl(meth)acrylate, octyl(meth) acrylate, decyl(meth)acrylate, dodecyl(meth)acrylate, octadecyl(meth)acrylate, cyclohexyl(meth)acrylate, phenyl (meth)acrylate, benzyl(meth)acrylate. These monomers may be used singly or in combination of two or more types. In the light of the balance between the transparency, rigidity, hardness, and the like, it is preferable that methyl(meth)acrylate is a major component. More preferably, methyl(meth)acrylate is 70 mass% or more of an amount of a monomer polymerizable with methyl(meth)acrylate.

As described above, the alumina particles of the present invention have a high aspect ratio of 5 to 80. By using the alumina particles as the filler and blending the same in a predetermined resin to obtain a resin composition, the rigidity, strength, and size stability thereof can be therefore improved. The alumina particles have a short axis length of 1 to 10 nm and a long axis length of 20 to 400 nm, which are smaller than the wavelength of visible light. Accordingly, the transparency can be maintained even when the alumina particles are contained in the resin as the filler. Consequently, using the alumina particles of the present invention can provide a resin composition having two characteristics of maintaining the transparency and increasing in the mechanical strength. The resin composition of the present invention can be used as organic glass for vehicles, which has been impossible because of the strength. The resin composition of the present invention can contribute considerable weight reduction compared to the conventional inorganic glass.

Hereinafter, a description is given of the embodiment of the present invention in detail with Examples and Comparative Examples. Analysis methods and analyzers employed in the present invention are as follows.

(1) Particle shape and length

Particle shapes were observed by a transmission electron microscope (TEM).

<Observation Method of Particle Shape>

Samples and pure water were mixed and then treated with an ultrasonic cleaner for 15 minutes. Thereafter, the samples were applied to a hydrophilic carbon-coated collodion film on a copper mesh and dried to prepare observation samples. Electron microscope images of the samples were photographed with a transmission electron microscope (120 kV, 70 mA, 100,000 magnification) and observed.

TEM copper mesh: Microgrid 150-B mesh, carbon-reinforced, manufactured by Okenshoji Co., Ltd.

Transmission electron microscope: JEOL JEM-1200EXII, manufactured by JEOL Ltd.

<Observation Method of Particle Length>

The micrographs taken by the transmission electron microscope were scanned as electron data by a scanner, and the particle lengths were measured using software to measure length on a commercially available personal computer. The short and long axis lengths and thickness each were measured for 100 pieces selected at random.

Software: Scion Image for Windows (registered trademark), manufactured by Scion corp.

(2) Particle cross section

Particle cross sections were measured by a transmission electron microscope (TEM).

<Observation Method of Particle Cross Section>

Solid alumina particles obtained by freeze drying were put into epoxy resin, thus embedding the particles in the resin. The cured resin was cut into thin sections with a thickness of about 60 to 100 nm using an ultramicrotome at room temperature. Thereafter, the thin sections were attached to TEM grids to prepare observation samples. Electron microscope images of the samples were photographed with a transmission electron microscope (300 kV, 400,000 magnification) and observed.

Ultramicrotome: FC-S type microtome, manufactured by REICHERT Inc.

Transmission electron microscope: H-9000, manufactured by Hitachi Ltd.

(3) Identification of alumina

Observation was made using a powder X-ray diffractometer.

<Observation Method>

The samples were pressed on non-reflecting plates for measurement to prepare observation samples. The observation samples were measured by the X-ray diffractometer and compared with the JCPDS (Joint Committee on Powder Diffraction Standards) of alumina for identification.

X-ray diffractometer: RINT-2000, manufactured by Rigaku Corporation (4) Measurement of mechanical and optical properties The obtained resin compositions were dried and granulated, followed by hot pressing to obtain sample films with a thickness of 2 mm. The obtained sheets were measured in terms of the light transmittance, bending strength, flexural modulus, and coefficient of linear expansion. The light transmittance was measured by a haze meter (HM-65, manufactured by Murakami color research laboratory). The bending strength and flexural modulus were measured by an autograph (DSC-10T, manufactured by SHIMADZU CORPORATION). The coefficient of linear expansion was measured by a thermomechanical analyzer, TMA120C, manufactured by Seiko Instruments Inc.

(5) Preparation of boehmite and alumina particles (Examples 1 to 11)

EXAMPLE 1

Aluminum chloride hexahydrate (2.0 M, 20 ml, 25° C.) was put into a Teflon beaker provided with a mechanical stirrer, and then sodium hydroxide (4.80 M, 20 ml, 25° C.) was dropped into the same for about 6 minutes while being stirred (700 rpm). After the end of the dropping, the mixture further continued to be stirred for 10 minutes, and after the end of stirring, the pH of the solution was measured (pH=4.54). Subsequently, the solution was separated into autoclaves provided with Teflon liners by 10 ml each, and then left at 120° C. in an oven for 24 hours (the first heat treatment). The autoclaves were then moved to an oil bath and heated at 180° C. for 20 minutes (the second heat treatment). Thereafter, the autoclaves were put into running water to be rapidly cooled to about 10° C. within 40 seconds (the third heat treatment). The third heat treatment was continued for 1 hour.

Subsequently, the autoclaves were put into the oven again and continued to be heated at 140° C. for 1 week (the fourth heat treatment) and then cooled with running water. After the supernatant of the solution in each autoclave was removed by centrifugation (1800 rpm, 30 min), the obtained product was centrifuge washed three times with sodium nitrate aqueous solution (0.5 M), washed once with water, and centrifuge washed three times with water-methanol mixed solution (volume ratio: water/methanol=0.5/9.5), followed by drying using a freeze dryer to obtain colorless crystal. As a result of X-ray diffraction, the obtained crystal was confirmed to be boehmite. The TEM photograph of the boehmite particles obtained by Example 1 is shown in FIG. 2, and the cross-sectional hollow TEM image is shown in FIG. 3.

Examination of the size of the boehmite particle revealed that the obtained crystal had a needle-shape with a long axis length of 350±37 nm, a short axis length of 5.5±0.5 nm, and an aspect ratio of about 45 to 80. The observed cross section along the short axis was hollow.

EXAMPLES 2 TO 9

Hereinafter, various boehmite particles were synthesized with the experimental conditions varied. The experimental conditions and obtained boehmite particles were shown in FIGS. 6 and 7, respectively. In Examples 2 to 6, the TEM images were similar to that of Example 1 except different lengths of the boehmite particles. Each of Examples 2 to 6 had also a hollow structure.

Figure 4:
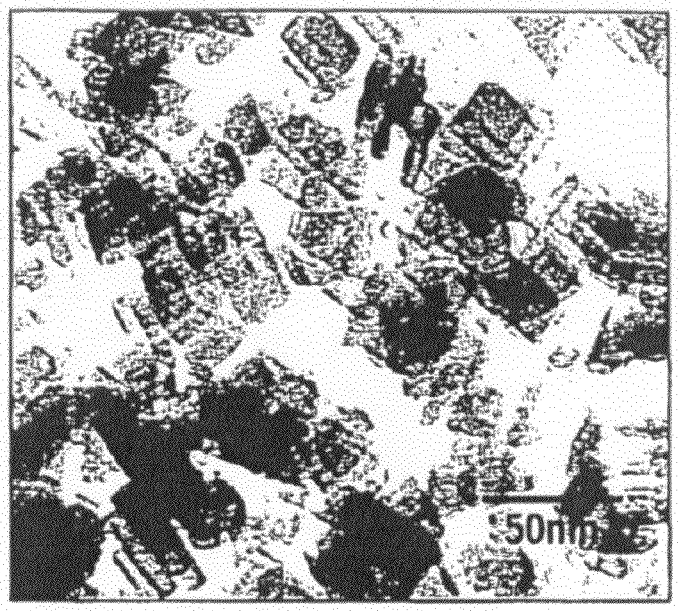
FIG. 4 is an electron micrograph of boehmite particles manufacture in Example 7.

On the other hand, in Example 7, the obtained boehmite particles were plate-shaped. It could be therefore confirmed that when the pH was higher than 9, plate-shaped boehmite particles were obtained instead of the needle-shaped particles. The TEM photograph thereof is shown in FIG. 4.

In Example 8, the obtained articles had a large standard deviation, which revealed that the standard deviation tended to be larger if the heat treatment was not separated into four steps.

Figure 5:
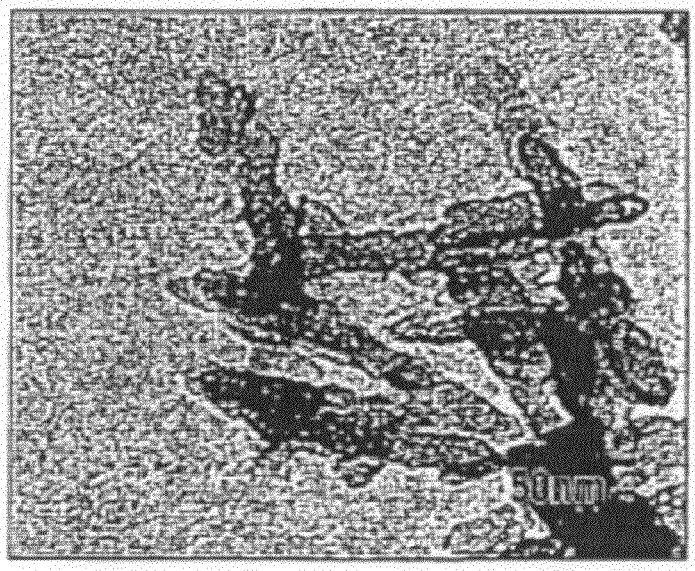
FIG. 5 is an electron micrograph of boehmite particles manufacture in Example 9.

Furthermore, in Example 9, amorphous particles were obtained. This revealed that if a wrong choice was made for the concentration of sodium hydroxide, the obtained particles were neither needle-shaped nor plate-shaped. The TEM photograph thereof is shown in FIG. 5.

EXAMPLE 10

The boehmite particles obtained in Example 1 were put into an alumina crucible and heated at 1000° C. for 4 hours to obtain white powder. At this time, to prevent the hollow structure characteristic to the aforementioned boehmite particles from being broken by thermal stress, the temperature increase and decrease rate was set to 2° C./min. Identifying the crystal phase using X-ray diffraction revealed that the powder was alumina.

As a result of examining reduction in weight of the powder during the heat treatment, the yield of this reaction was substantially 100%. In the TEM observation of the powder after the heat treatment, the particles substantially maintained their forms as they were before the heat treatment and were hollow needle-shaped particles. Examination of the size of the alumina particles revealed that the alumina particles were needle-shaped crystals with a long axis length of 353±33 nm, a short axis length of 5.4±0.6 nm, and an aspect ratio of about 45 to 80.

EXAMPLE 11

The boehmite particles obtained by the Example 2 were put into an alumna crucible and heated at 1000° C. for 4 hours to obtain white powder. At this time, to prevent the hollow structure characteristic to the aforementioned boehmite particles from being broken by thermal stress, the temperature increase and decrease rate was set to 2° C./min. Identifying the crystal phase using X-ray diffraction revealed that the powder was alumina.

As a result of examining reduction in weight of the powder during the heat treatment, the yield of this reaction was substantially 100%. In the TEM observation of the powder after the heat treatment, the particles substantially maintained their forms as they were before the heat treatment and were hollow needle-shaped particles. Examination of the size of the alumina particles revealed that the alumina particles were needle-shaped crystals with a long axis length of 110±10 nm, a short axis length of 4.7±0.5 nm, and an aspect ratio of about 20 to 30.

Comparative Example 1

9.2 g of magnesium acetate tetrahydrate, 20 g of aluminum hydroxide, and 40 g of pure water were put into an autoclave provided with a magnetic stirring bar and then stirred well. The mixture was heated to 205° C. at a temperature increasing rate of 80° C./hour while being stirred and kept at the temperature and pressure for 5 hours. Thereafter, the stirring and heating were stopped, and the mixture was naturally cooled. After the supernatant was removed by centrifugation (18000 rpm, 30 min), the obtained product was centrifuge washed three times with sodium nitrate aqueous solution (0.5 M), washed with water, and then centrifuge washed once with water-methanol mixed solution (volume ratio: water/methanol=0.5/9.5), followed by drying using a freeze dryer to obtain white powder.

As a result of X-ray diffraction, the white powder was confirmed to be boehmite. In the TEM observation, the crystals were needle shaped crystals with a long axis length of about 3 μm, a short axis length of about 0.1 μm, and an aspect ratio of about 20 to 30.

The Comparative Example 1 was a method disclosed in the Japanese Patent Unexamined Publication No. 2000-239014, a part of which is modified.

(6) Synthesis of resin composition (Examples 12 to 21)

EXAMPLE 12

In a reaction vessel provided with a decompressor, a mechanical stirrer, and a reflux unit, 11.5 g of the particles obtained in Example 1, 50.4 g (221 mmol) of bisphenol A, 49.6 g (232 mmol) of diphenylcarbonate, and a proper amount of tetrahydrofuran as a solvent were added and stirred for 1 hour. The system was gradually depressurized using a pressure reduction line to distill away tetrahydrofuran (THF) as the solvent. The temperature was further increased, and the obtained product was preheated at about 160° C. for 20 minutes to initiate a condensation reaction of the diarylcarbonate compound and the bisphenol.

Subsequently, the temperature of the reaction system is increased to 230° C. over 30 min. At this temperature, the condensation was advanced for about 150 minutes at a reduced pressure of 15 mmHg or less while the mixture was stirred, thus reducing an oligomer component unreacted. Finally, the mixture was ripened for 20 minutes in a range of 260 to 290° C. with the reduced pressure unchanged to obtain a polycarbonate resin composition.

The obtained resin composition was dried and granulated, followed by hot pressing to obtain a 2 mm thick plate. The properties of the obtained sample plate was examined, and the light transmittance was 75%; the bending strength, 130 GPa; the flexural modulus, 5.0 MPa; the coefficient of linear expansion, $5.5\times10^{-5}$/° C.; and the amount of particles blended, 10.7% by weight.

EXAMPLES 13 TO 16

Hereinafter, the filling particles were selected from the Examples 1, 2, 4, 10, and 11, and polycarbonate resin compositions were synthesized by the same method as the Example 12. The experimental conditions and properties were shown in FIG. 8.

EXAMPLE 17

1000 ml of xylene as a solvent, 78 g of methyl methacrylate, 25 g of acrylic acid, 0.5 mol% of azobisisobutyronitrile (AIBN) as a polymerization initiator were added into a flask in an inert gas stream. The mixture was heated to 80° C., into which 10 g of the boehmite particles of the Example 1 were added over 10 minutes while being stirred. The mixture was maintained at 80° C. for 24 hours while being stirred. After the end of the reaction, the obtained product was returned to the room temperature and then added with excessive n-hexane to precipitate polymer, and then the polymer was filtered to obtain methacrylate type resin composition. The obtained resin composition was dried and granulated, followed by hot pressing to obtain a 2 mm thick plate. The properties of the obtained plate was examined, and the light transmittance was 78%; the bending strength, 132 GPa; the flexural modulus, 5.1 MPa; the coefficient of linear expansion, $6.0\times10^{-5}$/° C.; and the amount of particles blended, 10.6% by weight.

EXAMPLES 18 TO 21

Hereinafter, the filling particles were selected from the Examples 1, 2, 4, 10, and 11, and methacrylate type resin compositions were obtained by the same method as Example 17. The experimental conditions and properties are shown in [Table 3] *FIG. 8*.

Comparative Example 2

Desired polycarbonate resin composition was obtained in a same manner as Example 12 except use of 11.8 g of the particles obtained in Comparative Example 1. Subsequently, in the same manner as Example 12, a 2 mm thick sample plate was obtained. In the sample plate, the light transmittance was 10%; the bending strength, 110 GPa; the flexural modulus, 3.8 MPa; the coefficient of linear expansion, $6.9\times10^{-5}$/° C.; and the amount of particles blended, 9.2% by weight.

Comparative Examples 3 to 6

Next, polycarbonate resin compositions were synthesized by the same method as Comparative Example 1. The experimental conditions and properties were shown in FIG. 9.

The alumina particles used for Comparative Example 3 was Alumina Sol 520 made by Nissan Chemical Industries, Ltd. The alumina sol was on the market as an alumina dispersed-in-water solution of 20% by weight and was freeze dried for use as a dried solid. The particles have a boehmite structure and include stick-shaped and particle-shaped particles with a diameter of 10 to 20 nm.

The aluminum oxide C used for Comparative Example 4 was made by Nippon Aerosil Co., Ltd. Particles of the aluminum oxide C have a spherical shape with a diameter of about 13 nm.

The alumina particles used for Comparative Example 5 was CAM90 made by Saint-Gobain Ceramic Material K.K. The particles have a rugby ball-like shape with a long axis length of about 90 nm and a short axis length of 10 to 15 nm. Not only the particles independently exist, but also four or five particles are linked together.

The particles used for Comparative Example 6 were silica particles, SNOWTEX MEX-ST, made by Nissan Chemical Industries, Ltd. The SNOWTEX MEX-ST had a concentration of alumina of 30% by weight and was commercially available with alumina dispersed in methylethylketone. The SNOWTEX MEX-ST was dried by spray drying and used as a solid. The particle diameter was about 10 to 20 nm.

As apparent from the results in FIGS. 8 and 9, the resin composition containing the alumina particles of the present invention was excellent in light transmittance, bending strength, and flexural modulus, which revealed that both the transparency and the mechanical strength were excellent.

Hereinabove, the present invention has been described in detail with the specific examples. However, the present invention was not limited to the aforementioned contents, and various modifications and changes can be made without departing from the scope of the present invention.

For example, the resin composition of the present invention is, when necessary, can be added with an antioxidant, a thermal stabilizer, an ultraviolet absorber, a lubricant, a mold release agent, dyestuff, a colorant including pigment, an attachment agent of an additive, a nucleating agent, and the like singly or in proper combination. The oxidant and thermal stabilizer are hindered phenol, hydroquinone, thioether, phosphates, substitutions thereof, or the like. The ultraviolet absorber is resorcinol, salycylate, benzotriazole, benzophenone, and the like. The lubricant and mold release agent are silicone resin, montanic acid or salts thereof, stearic acid or salts thereof, stearyl alcohol, stearyl amide, or the like. The dyestuff is nitrosin or the like. The pigment is cadmium sulfide, phthalocyanine, or the like. The attachment agent is silicone oil or the like. The nucleating agent is talc, kaolin, or the like.

The entire content of a Japanese Patent Application No. P2004-246828 with a filing date of Aug. 26, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A resin composition, comprising:

resin; and an alumina particle contained in the resin as a filler, the alumina particle comprising:

an alumina body with a short axis length of 1 to 10 nm, a long axis length of 20 to 400 nm and an aspect ratio of 5 to 80, the alumina body being expressed by a Formula I, $$Al_2O_3nH_2O \qquad \text{Formula I}$$

wherein n is not less than 0, wherein a light transmittance of the resin composition is 73-88%.

2. The resin composition according to claim 1, wherein the alumina body includes a hollow inside.

3. The resin composition according to claim 1, wherein when n is 0 in the Formula I, the alumina body is α alumina.

4. The resin composition according to claim 1, wherein when n is 1 in the Formula I, the alumina body is boehmite.

5. The resin composition according to claim 1, wherein a content of the alumina particle is within a range from 1 to 50% by weight.

6. The resin composition according to claim 1, wherein the resin is at least a kind of thermoplastic resin selected from polycarbonate resin, acrylic resin, and methacrylic resin.

7. The resin composition according to claim 1, wherein the aspect ratio of the alumina body is within a range from 30 to 40.

8. The resin composition according to claim 1, wherein the aspect ratio of the alumina body is within a range from 45 to 80.

9. The resin composition according to claim 1, wherein the alumina body includes one cylindrical hollow inside, and a diameter of the hollow is within a range from 0.5 to 9.5 nm, which is not more than the short axis length of the alumina particle, and a length of the hollow is within a range from 5 to 400 nm, which is not more than the long axis length of the alumina particle.

10. The resin composition according to claim 1, wherein the short axis length and the long axis length of the alumina particle are smaller than a wavelength of visible light.

11. The resin composition according to claim 1, wherein a bending strength of the resin composition is 109-132 GPa.

12. The resin composition according to claim 1, wherein a flexural modulus of the resin composition is 3.7-5.1 MPa.

13. The resin composition according to claim 1, wherein a coefficient of linear expansion of the resin composition is $5.5\times10^{-5}/°$ C.-$6.7\times10^{-5}/°$ C.

*14. A resin composition, comprising:*

*resin; and*

*an alumina particle contained in the resin as a filler, the alumina particle comprising:*

*an alumina body with a short axis length of 1 to 10 nm, a long axis length of 20 to 400 nm and an aspect ratio of 30 to 40, the alumina body being expressed by a Formula I,*

$$Al_2O_3nH_2O \qquad \text{Formula I}$$

*wherein n is not less than 0,*

*wherein a light transmittance of the resin composition is 73-88%, and*

*wherein a content of the alumina particle is within a range from 1 to 50% by weight.*

*15. The resin composition according to claim 14, wherein the alumina body includes a hollow inside.*

*16. The resin composition according to claim 14, wherein when n is 0 in the Formula I, the alumina body is α alumina.*

*17. The resin composition according to claim 14, wherein when n is 1 in the Formula I, the alumina body is boehmite.*

*18. The resin composition according to claim 14, wherein the resin is at least a kind of thermoplastic resin selected from polycarbonate resin, acrylic resin, and methacrylic resin.*

*19. The resin composition according to claim 14, wherein the short axis length and the long axis length of the alumina particle are smaller than a wavelength of visible light.*

*20. The resin composition according to claim 14, wherein a bending strength of the resin composition is 109-132 GPa.*

*21. The resin composition according to claim 14, wherein a flexural modulus of the resin composition is 3.7-5.1 MPa.*

*22. The resin composition according to claim 14, wherein a coefficient of linear expansion of the resin composition is $5.5\times10^{-5}/°$ C.-$6.7\times10^{-5}/°$ C.*

*23. A resin composition, comprising:*

*resin; and*

*an alumina particle contained in the resin as a filler, the alumina particle comprising:*

*an alumina body with a short axis length of 1 to 10 nm, a long axis length of 20 to 400 nm and an aspect ratio of 45 to 80, the alumina body being expressed by a Formula I,*

$$Al_2O_3nH_2O \qquad \text{Formula I}$$

*wherein n is not less than 0, and*

*wherein a light transmittance of the resin composition is 73-88%, and*

*wherein a content of the alumina particle is within a range from 1 to 50% by weight.*

*24. A resin composition, comprising:*

*resin; and*

*an alumina particle contained in the resin as a filler, the alumina particle comprising:*

*an alumina body with a short axis length of 1 to 10 nm, a long axis length of 20 to 400 nm and an aspect ratio of 5 to 80, the alumina body being expressed by a Formula I,*

$$Al_2O_3nH_2O \qquad \text{Formula I}$$

*wherein n is not less than 0, and*

*wherein the alumina body includes one cylindrical hollow inside, and a diameter of the hollow is within a range from 0.5 to 9.5 nm, which is not more than the short axis length of the alumina particle, and a length of the hollow is within a range from 5 to 400 nm, which is not more than the long axis length of the alumina particle,*

*wherein a light transmittance of the resin composition is 73-88%, and*

*wherein a content of the alumina particle is within a range from 1 to 50% by weight.*

* * * * *